(No Model.) 2 Sheets—Sheet 1.
J. H. BRUBAKER.
CIDER OR WINE PRESS.
No. 363,798. Patented May 31, 1887.
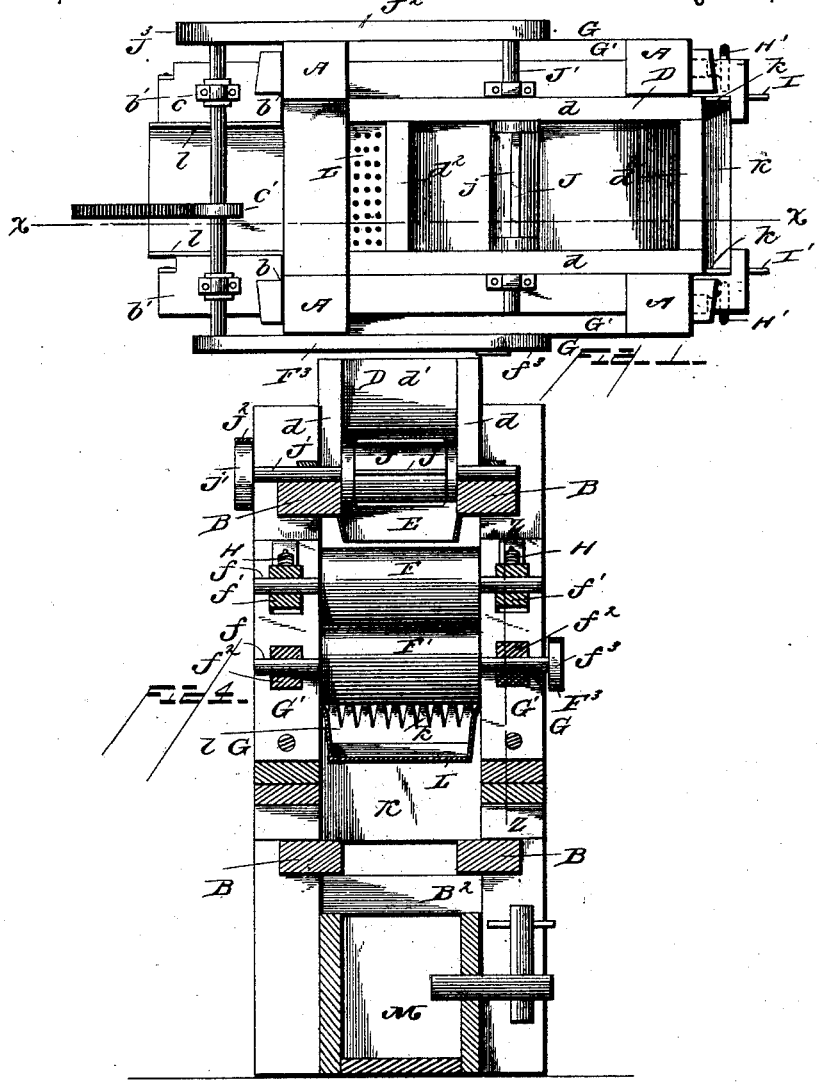
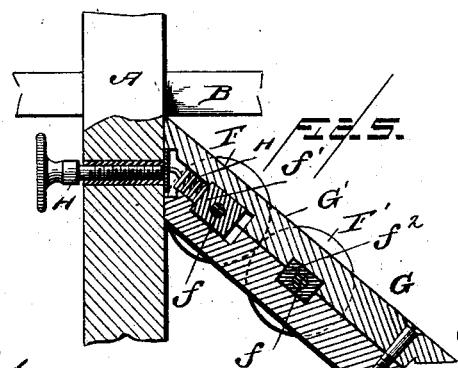
Witnesses
Inventor
Jacob H. Brubaker.
By his Attorneys

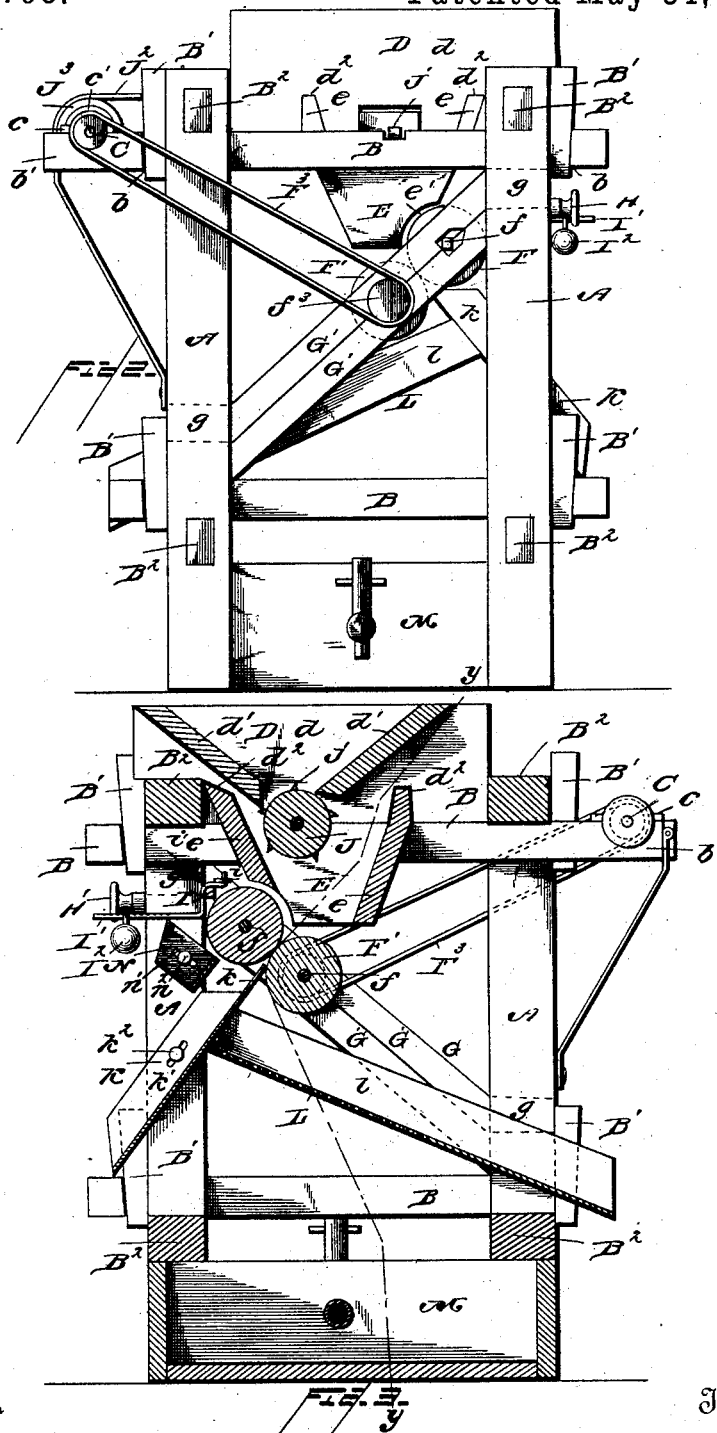

United States Patent Office.

JACOB H. BRUBAKER, OF ROCKTON, PENNSYLVANIA.

CIDER OR WINE PRESS.

SPECIFICATION forming part of Letters Patent No. 363,798, dated May 31, 1887.

Application filed December 17, 1886. Serial No. 221,883. (No model.)

*To all whom it may concern:*

Be it known that I, JACOB H. BRUBAKER, a citizen of the United States, residing at Rockton, in the county of Clearfield and State of Pennsylvania, have invented certain new and useful Improvements in Cider and Wine Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in cider and wine presses; and it consists of the peculiar combination of devices and novel construction and arrangement of the various parts for service, substantially as hereinafter fully described and claimed.

The primary object of my invention is to provide an improved press of the class named which will cut up or reduce the fruit to a pulp, then compress the same to extract the juice therefrom, and, finally, screen the pulp and discharge it from the machine separate from the fluid or liquid, all these operations being carried on continuously and without the aid of an operator, it only being necessary for the latter to feed the fruit to the hopper of the press.

A further object of my invention is to provide a press with improved pressure-rollers for extracting the juice or liquid from the pulp, and to provide the said rollers with mechanism for regulating the pressure or force which they exert upon the pulp as it passes between the same.

A further object of my invention is to provide the press with mechanism for scraping and carrying off the pulp, after the juice has been extracted therefrom, from the pressure-rollers, and to provide the press with a screen for preventing small particles of pulp from passing into the vat along with the juice after the latter has been extracted from the pulp, thereby clarifying the juice before its removal from the vat of the press, so that it is in condition for immediate use.

I have shown an embodiment of my invention in the accompanying drawings, in which Figure 1 is a top plan view. Fig. 2 is an elevation taken from one side of the machine. Fig. 3 is a vertical longitudinal sectional view on the line $x\ x$ of Fig. 1. Fig. 4 is a vertical transverse sectional view on the line $y\ y$ of Fig. 3. Fig. 5 is a detail vertical sectional view on the line $z\ z$ of Fig. 4.

Referring to the drawings, in which like letters of reference denote corresponding parts in all the figures, A designates the uprights of my improved cider and wine press, which are preferably four in number, and arranged a suitable distance apart; and B, the horizontal timbers which connect and brace the uprights together to form a very firm and rigid supporting-frame, in which the various mechanisms for reducing, compressing, and screening the fruit are supported. These horizontal timbers are preferably provided with notches $b$ on one side, in which are fitted the uprights or standards A, and these notches are of greater length than the width of the standards, to permit keys or wedges B' to be driven between one end of the notches in the said horizontal timbers and the uprights, in order to firmly key the several parts together. These keys are tapered longitudinally, in order to tighten the structure when it becomes loosened through the strain on the press when it is in use, and these wedges or keys are tapered transversely and fit like inclined edges in the end of the notches to prevent lateral displacement of the keys.

The uprights or standards A are further braced and strengthened by transverse timbers B², which are rigidly connected thereto in any suitable manner. One of the ends of the upper horizonal timbers, B, is extended beyond the uprights or standards contiguous thereto, as shown at $b'$, and on these extended ends of the said timbers are rigidly affixed or secured suitable bearings, $c$, in which is journaled the horizontal driving-shaft C, to which power is communicated from a suitable motor through a pulley, $c'$, on the said shaft and a suitable belt, as shown; or a crank can be affixed or connected to one end of the shaft in order that it may be rotated by hand. I have not deemed it essential to illustrate mechanism for driving the said shaft by hand, as this feature of my invention will be readily understood by a skilled mechanic.

D designates the receiving-hopper in which the fruit is placed, which has the parallel vertical sides $d$ and the inclined converging ends $d'$, and beneath this hopper is arranged the contracted discharge-throat E, which receives the contents of the hopper and directs the same between the pressing-rollers F F', as will be more fully described presently.

The lower edges of the parallel sides $d$ of the hopper D are provided with notches $d^2$, in which are fitted the upper ends of the converging end boards, $e$, of the contracted discharge-throat E, and the side and end boards of this throat E are converged toward each other at their lower ends, so as to provide a contracted discharge opening or outlet for the fruit. The rear end wall and the rear edges of the side walls of this discharge-throat are cut away, as at $e'$, and the upper presser-roll, F, fits closely and snugly in these cut-away portions, as shown in Figs. 2 and 3 of the drawings. The lower presser-roll, F', is arranged a little to one side of the upper presser-roll, so that the contents of the hopper is caused to pass between the rollers to extract the juice or liquid matter therefrom. These presser-rolls are made of wood or metal; or they may be made of wood and covered with sheet metal or of vulcanized rubber, as I do not wish to confine myself to any particular material of which the rollers can be made. The rollers are rigidly affixed to and carried by suitable shafts, $f$, or, if made of metal, the cast rollers may have the shaft or trunnions formed integral therewith. The upper presser-roll has its shaft journaled in sliding boxes or bearings $f'$, which are supported in the manner presently described, while the lower presser-roll has its shaft or trunnions journaled in fixed bearings or boxes $f^2$.

Vertically-inclined supporting-timbers G are arranged between two adjoining vertical uprights, A, and each of these supporting-timbers is made in two or more separable sections, G', which are secured or held together by suitable through-bolts or other devices. The upper sections of these supporting-timbers have tenons $g$ at their ends, which are fitted in mortises in the opposing faces of the vertical timbers A to more securely hold the same in place. At or near the middle of these inclined supporting-timbers the sections thereof have recesses formed in their opposing faces for the reception of the fixed bearings $f^2$ of the lower presser-roll, and the said sections have similar recesses formed near their upper ends for the reception of the sliding bearings of the movable upper roll, F, the said upper recesses being made considerably longer than the lower recess to permit the bearings $f^2$ to move freely therein, and they extend through the end of the said sections of the inclined supporting-timbers, as shown in Fig. 5 of the drawings. Coiled springs H are fitted in the upper terminal ends of these upper recesses of the inclined supporting-timbers, and these springs bear upon the sliding bearings $f^2$, to normally press the said bearings and the roller F, journaled therein, toward the lower roller, F'. The tension of these springs and the force with which the upper roller presses on the lower roller can be varied and regulated by means of suitable screws, H', which work in threaded bearings in the vertical standards A, the inner ends of the said regulating-screws being adapted to bear upon and compress the springs, while the outer ends thereof have suitable appliances whereby they can be turned or rotated by hand, as will be readily understood. I also employ additional means for forcing the upper movable presser-roll toward the lower one, which consists of a horizontal transverse bar, I, which is arranged in rear of the roll F, and has its ends bearing upon the upper sides of the sliding bearings $f'$ and the weighted levers I', which bear upon the said bar I, and thus force the latter into contact with the upper roll, F. These levers I' are arranged at opposite sides of the frame, and the inner ends thereof are suitably supported in fixed loops or brackets $i$, the said inner ends of the levers having a short crank, $i'$, formed thereon, which bears against the rear side of the transverse bar I. The outer ends of the levers have a series of teeth or serrations formed thereon, and with one of the teeth or serrations of each lever engages a fixed loop of a weight, I², which is suspended from the free end of the lever, as clearly shown.

J designates a reducing or cutter roller, which is located in the hopper beneath the converging end walls thereof. This reducing-roller is provided with a series of blades or cutters, $j$, which are preferably arranged longitudinally thereof, as shown, although the arrangement of the said blades can be varied without departing from the principle of my invention. In lieu of providing the said roller with the blades or cutters, it may have a metallic sheath which has a series of teeth for grating, and thus reducing the fruit placed in the hopper; but I prefer to provide the reducing-roll with the blades. This roller is carried by a suitable shaft, J', which is journaled in fixed bearings of any preferred class on the frame, and one end of the shaft is extended beyond the frame and provided with a suitable pulley, $j'$, over which passes a driving-belt, J², which is driven from a suitable pulley, J³, on one end of the driving-shaft at one end of the press.

One end of the shaft of the lower presser-roll, F', is extended beyond the bearing provided therefor and the frame, and on this extended end of the shaft of the said roller is rigidly affixed a suitable pulley, $f^3$, over which a driving-belt, F³, passes, this belt being driven from a suitable pulley on the opposite end of the driving-shaft to the pulley J³ for the reducing-roll. It will thus be seen that the reducing-roller and one of the presser-rolls are positively driven from the driving-shaft, and that the upper presser-roll is normally pressed or forced into contact with the lower positively-driven presser-roll and is rotated by frictional contact therewith, while at the same time the said upper roll is capable of a sliding movement to permit the pulp to pass between the presser-rolls.

K designates the inclined discharge-board which is arranged at the rear end of the machine. The upper end of this discharge-board is arranged in close proximity to and between the upper and lower presser-rolls, while the lower end thereof extends beyond the rear part of the frame of the press, in order that the pulp may be discharged into a suitable receptacle after the juice or liquid matter has been extracted therefrom. The upper end of this discharge-board is cut or formed with a series of tapering fingers, $k$, with intermediate spaces, through which the liquid from the presser-rolls is free to escape, and these fingers are adapted to scrape the pulp that may adhere to the presser-rolls, and thus clear the latter. The discharge board or chute is provided with right-angled flanges $k'$, in which are formed one or more longitudinal slots, through which are passed adjusting-screws $k^2$, which are secured in the vertical standards A, and thereby support the said chute or board in place, while permitting it to be adjusted toward and away from the presser-rolls, as circumstances may require or demand.

L is the screen, which is inclined in the reverse direction from the discharge board or chute. This screen is provided with the right-angled flanges $l$, through which are passed suitable screws or bolts to secure it in place, and the front end of the screen extends or projects beyond the front end of the frame of the press to discharge any small particles of pulp that may escape from the presser-rolls with the liquid matter. The upper end of the screen is arranged below the fingers of the discharge-chute, and it bears against the lower side of the chute beneath the line of the terminal ends of the fingers, in order to catch any liquid which may escape down the fingers, so that the liquid is forced to flow down the screen into the vat or receptacle placed beneath the same. This screen may be made of sheet metal and perforations cut therein; or it may be made of wire similar to the common forms of screen in use.

M designates the vat or receptacle for the cider or liquid matter extracted from the fruit by the press, and this vat has an outlet-cock or spigot for drawing off the contents thereof.

A scraper, N, is arranged in rear of the upper presser-roller, F, with one edge thereof arranged in close proximity thereto, in order to clear the roll of any adhering particles of pulp which is carried around with the same. The ends of the said scraper are provided with flanges $n$, in which are formed slots $n'$, through which pass adjusting-screws $n^2$, that work in suitable bearings in the uprights A, and thereby permit the scraper to be adjusted nearer to and farther from the said upper roll, F.

This being the construction of my improved press, the operation thereof is as follows: Power is first communicated through the belt or a hand-crank to the driving-shaft C to rotate the reducing-roll and the lower presser-roll, F'. The fruit is placed by the attendant in the hopper, where it is crushed and reduced to a pulp by the roller therein, and the pulp then passes through the discharge-throat beneath the hopper to and between the presser-rolls, where the juice or liquid matter is extracted by the said presser-rolls. The waste pulp passes to and is discharged by the inclined chute, while the liquid is passed down the screen and falls or escapes through the same into the vat provided therefor. The fingers of the inclined discharge-chute scrape the pulp from the rollers, while the scraper N also scrapes it from the upper roll, F, and the matter then falls upon the chute to be discharged from the press. By moving the weights on the levers or adjusting the screws the force which the transverse bar I and the springs exert on the movable presser-roll can be varied, and thus regulate the force which the two rollers exert on the pulp which passes between the same.

It will thus be seen that I provide an improved press of simple and durable construction in which the operations of reducing, pressing, and clarifying the substance or fruit are carried on continuously, and the rollers are cleared of adhering matter or pulp, which is effectually discharged from one end of the press, while the extracted liquid matter is discharged into a separate vat or receiver.

I would state that while I deem the devices and mechanisms herein shown and described as best adapted for carrying my invention into practice, still I do not desire to limit myself to the exact details of construction, nor form and proportion of parts, as I am aware that changes and modifications therein can be made within wide limits without departing from the spirit of my invention.

Having thus fully described my invention, what I claim as new, and desire to secure by Letters Patent, is—

1. In a press, the combination of a hopper, a reducing-roll operating therein, and the presser-rolls arranged beneath the hopper and to one side of each other, and at an angle to the hopper, to receive the contents from the contracted lateral discharge-opening therein, substantially as described, for the purpose set forth.

2. In a press, the combination of a frame, a hopper supported therein and having the end walls provided with the notches in their base portions, the inclined discharge-throat having the converging walls and the upper edges of its end walls fitted in the notches in the corresponding walls of the hopper, and having the cut-away portions $e'$ in its rear end wall and the rear edges of the side walls thereof, as described, the reducing-roll operating in the hopper above the discharge-throat, the upper movable presser-roll arranged in close proximity to the cut-away portion of the throat, the lower fixed roll, and a driving-shaft having intermediate connections with the reducing and lower press-rolls, substantially as described.

3. In a press, the combination of the frame comprising the vertical uprights or standards, the horizontal timbers having the notches in one side, in which the standards are fitted, and the longitudinally and transversely tapered keys or wedges fitted between the inclined ends of the notches in the horizontal timbers and vertical standards, the upper horizontal timbers, B, having extensions at one end, and a driving-shaft journaled in said extensions, substantially as described.

4. In a press, the combination, with the hopper and the presser-rolls, of the inclined discharge-chute having fingers at its upper end which are substantially arranged between the said presser-rolls, substantially as described.

5. In a press, the combination, with a hopper and the presser-rolls, of the inclined chute and the screen inclined in the reverse direction to the chute, substantially as described, for the purpose set forth.

6. In a press, the combination, with a hopper and the presser-rolls, of the inclined discharge-chute having the tapering fingers projected, substantially, between the said rollers, and the screen inclined in the reverse direction to the chute and having its upper end bearing against the same at a line below the terminal ends of the fingers thereof, substantially as described, for the purpose set forth.

7. In a press, the combination of a hopper, a reducing-roll operating therein, the presser-rolls arranged beneath the contracted exit-opening in the hopper, the inclined discharge-chute having the fingers, with spaces intermediate of the fingers, and the slotted flanges through which the adjusting-screws are passed, the screen inclined in reverse direction to the chute and having its upper end arranged beneath and bearing against the chute beneath the terminal ends of the fingers thereof, the vat arranged beneath the screen, and the scraper arranged above the chute and in close proximity to one of the presser-rolls to scrape the pulp adhering thereto and discharge it upon the chute, substantially as described, for the purpose set forth.

8. In a press, the combination, with a hopper and the presser-rolls, of the inclined discharge-chute and an adjustable scraper arranged in close proximity to one of the rolls and above the chute, substantially as described.

In testimony whereof I affix my signature in presence of two witnesses.

JACOB H. BRUBAKER.

Witnesses:
JAS. B. CLOUSER,
J. W. LABORDE.